Figure 1:
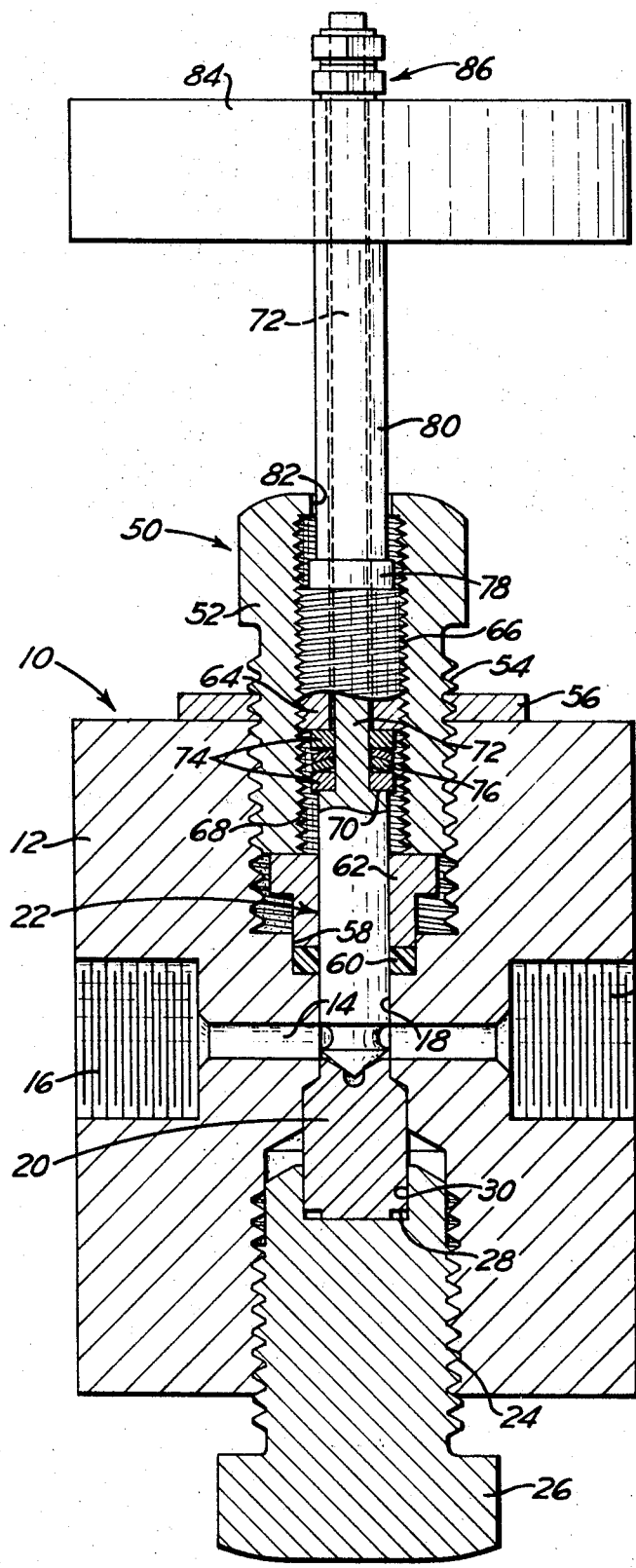

United States Patent

[11] 3,583,233

| [72] | Inventors | Robert H. Jacoby<br>Oakmont;<br>Dennis G. Downes, Washington Township;<br>Joseph H. Tracht, Pittsburgh, all of, Pa. |
|---|---|---|
| [21] | Appl. No. | 852,210 |
| [22] | Filed | Aug. 22, 1969 |
| [45] | Patented | June 8, 1971 |
| [73] | Assignees | Robert H. Jacoby;<br>Dennis G. Downes; John K. Rodgers,<br>Oakmont, Pa., part interest to each |

[54] PORTABLE CHROMATOGRAPHIC SAMPLE HOLDER
14 Claims, 4 Drawing Figs.

[52] U.S. Cl. ..................................................... 73/422
[51] Int. Cl. ..................................................... G01n 1/10
[50] Field of Search........................................... 73/422,
23.1, 61.1 C; 277/236; 251/359; 250/41.9 S

[56] References Cited
UNITED STATES PATENTS

| 2,702,479 | 2/1955 | Black et al. .................... | 73/422 |
| 3,166,939 | 1/1965 | Koeller et al. ................. | 73/422 |
| 3,483,754 | 12/1969 | Chambers ..................... | 73/422 |

*Primary Examiner*—S. Clement Swisher
*Attorney*—William Kovensky

ABSTRACT: A sampler for chromatographic use having a body formed with a pair of intersecting passageways, one of which is a flow passageway, and the other of which removably mounts a stem. Means to move the stem without rotating it, means to automatically determine the sealing pressure at the metal-to-metal, stem-to-holder sealing area, and means to permit free flow of fluid through the flow passageway regardless of the position of the stem, are provided, as well as a removable and variable capacity sample holder.

PATENTED JUN 8 1971

3,583,233

INVENTORS.
ROBERT H. JACOBY
DENNIS G. DOWNES
JOSEPH H. TRACHT

PORTABLE CHROMATOGRAPHIC SAMPLE HOLDER

This invention pertains to both gas and liquid chromatography, and more particularly it is directed to a sample holder which permits a sample to be taken at a first location, such as an operating or producing facility or other field location, and then shipped or otherwise transported to a second location, such as a laboratory, for analysis, in a rapid and facile manner, while, most importantly, maintaining sample integrity.

As used herein, "sample integrity" shall mean isolation of the sample from all contaminating surrounding environments so that it arrives at the second location in the same condition at which it was taken from the first location. "Sample integrity" also shall mean that none of the sample has been lost so that analysis will be performed on the same quantity and quality of sample material, and that no contaminants have been comingled into the sample so that the analysis will in fact be performed on the same material that is being handled at the first location.

Heretofore, especially in pressurized systems, samples were not taken easily from one location to another for chromatographic analysis because of the difficulties involved in maintaining sample integrity. It is very often desirable to take a sample to a lab for analysis because of the higher quality, higher accuracy, and in general better analysis that can be performed than at an operating location or in the field outside the lab generally. When a sample was taken to a lab, which often was done only as a last resort after all else had failed, it was usually a relatively large sample. Certain government regulations prohibit or at least impose severe restrictions on transportation of large pressure vessels. This problem becomes especially acute when the sample is in liquid form. Because these same regulations prohibit transportation of vessels 100 percent full of liquid under pressure, it was necessary to leave a void in the vessel above the liquid. This void permitted the more volatile components of the sample liquid to go into a gaseous phase, thus producing a differential loss of components during transfer and destroying the accuracy of the analysis when finally performed at the lab. Removal of a sample from the pressure vessel or "bomb" at the lab is an involved, time-consuming process.

There are many different kinds of sample handling devices known in the prior art, and all of them suffer from disadvantages which are overcome by the invention. For example, various kinds of slide valves having O-ring seals are known. This type of valve has two major disadvantages. First, it is pressure limited by the quality of the seal. Devices rated for about 800 p.s.i., which is fairly low, have been found to leak at about 200 p.s.i. Secondly, the rubber or other material of the seals comes into contact with the test fluid, and, depending on the natures of the seal material and of the test fluid, this contact could cause a chemical reaction or could otherwise contaminate the test fluid. Another general class of prior devices are those that depend on a syringe and a resealable septum. Here again, this type of device suffers from two major disadvantages. First, it is useful at very low pressure only, on the order of 10 p.s.i. maximum, for the obvious reasons of manual manipulation and not exploding the septum. Secondly, because of the inherent nature of the thin hollow needle which is used, the sample is not inserted as a slug, as required for proper chromatographic analysis, but is inserted over a finite length of time, thus causing the final results to be time dependent.

The present invention provides means to easily, on a routine basis, move samples, liquid or gas, between locations while insuring sample integrity en route. The invention overcomes all the disadvantages of the prior known devices. Pressure can be held up to many thousands of p.s.i., and in any case more than sufficient for chromatographic analysis. The sample contacts only metal, thereby obviating any possibility of sample contamination. Finally, the sample is inserted as a slug, and means are provided to both select the quantity of sample to be transported, and to cause the carrier gas to "sweep" the sample cavity to assure that all of the sample is carried off into the chromatograph for analysis.

The sample holder of the invention comprises a valvelike assembly comprising a valve body formed with a pair of mutually perpendicular intersecting passageways. The first of said passageways comprises the carrier gas and test fluid flow passageway which is formed with means at its ends to permit easy and rapid connection and disconnection of the sample holder to and from cooperating equipment at both locations. The second passageway, a composite through opening, is formed with means to trap a sample of the fluid flowing in the first passageway while permitting uninhibited flow through the first passageway before, during and after the step of taking a sample.

The sample trapping means of the invention is characterized by its simplicity of concept, fabrication, and operation, along with its concomitant durability and reliability. The trapping means comprise a holder member and a cooperating stem member with means to permit quick and easy removal and replacement of the holder member in said second passageway to permit taking of different volumes of sample. A metal to metal contact is provided between the holder and stem around the trapped sample therebetween thereby achieving high pressure reliability, and preventing the sample from contacting any material with which it might react. The contact and the seal is provided between a pair of conical surfaces, a female surface in the holder and a male mating surface on the stem. A sample cavity is formed in the holder at the bottom of its conical surface, and the included angle of the holder's surface is larger than that of the male surface on the stem. Thus, there is formed an edge-to-surface and metal-to-metal contact between the edge formed at the junction of the sample cavity and the conical surface in the holder, and the male surface on the stem. This structure provides several advantages. The valve's useful life is prolonged because the edge-to-surface contact will automatically accommodate itself to slight wear of the sealing edge on the holder. This advantage is assured by the difference in included angles of the two conical surfaces. Thus, as said edge wears slightly, a new edge is formed to contact a new location on the stem's surface. Another advantage is that as the stem is moved off of the holder to release a sample held in the cavity, the conical surfaces will direct the flow of carrier gas between themselves and into the sample cavity to sweep the sample out as a slug. The same advantage obtains when the procedure is reversed to trap a sample in the holder sample cavity.

Figure 2:
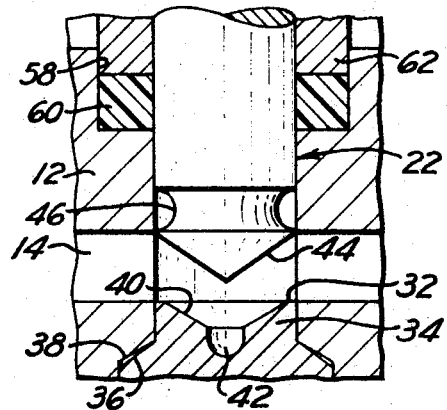
Figure 3:
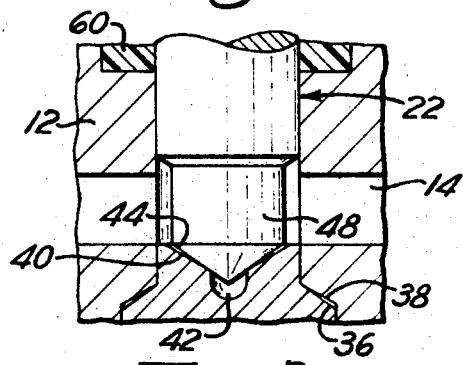
Figure 4:
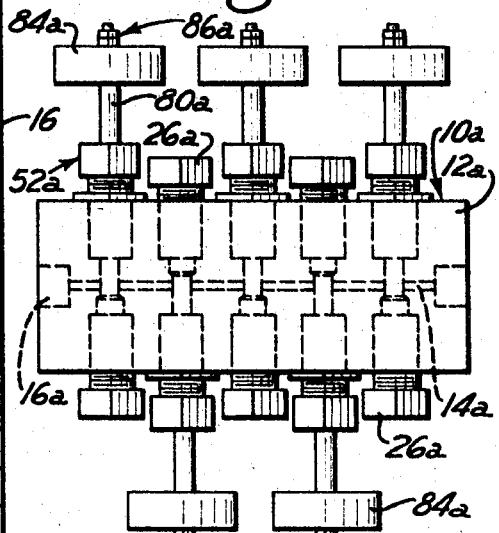

The above and other advantages of the invention will be pointed out or will become evident in the following detailed description and claims, and in the accompanying drawing also forming a part of the disclosure, in which: FIG. 1 is a longitudinal, cross-sectional view of a sample holder embodying the invention with some parts only partly broken away; FIG. 2 is an enlarged showing of part of FIG. 1 showing the stem off of the holder; FIG. 3 is a view similar to FIG. 2 showing a modified stem end construction and showing the stem on the holder; and FIG. 4 is an external elevational view of another embodiment adapted to take multiple samples.

Referring now in detail to the drawing, 10 designates a sample holder embodying the invention which comprises a main body 12 formed with a first through passageway 14. Means are provided to permit easy connection and disconnection of holder 10 from cooperating apparatus, not shown, and to permit flow of samples and carrier gas through the holder. To this end threads 16, or other suitable means, are provided at the opposite ends of passageway 14. Thus, sample and carrier fluid flow through the body 12 in the passageway 14.

Main body 12 is formed with a composite through opening or second passageway 18 intersecting passageway 14 at substantially a right angle. To one side of passage 14 opening 18 is formed with means to removably mount a sample holder member 20 and to the other side of passageway 14, opening 18 is formed with means to removably mount a sample stem member 22.

On the sample holder side, that end of composite opening 18 is formed with threads 24 which cooperate with suitably formed mating threads on a plug member 26 to securely hold the member 20 in position, as will appear below. Holder member 20 itself is of essentially a "milk can-line" shape, and is formed with an annular notch 28, chamfer, or the like, to facilitate removal of member 20 out of the mating cavity 30 formed in the inner end of plug 26 in which the holder member seats. The inner end of the holder member 20, see FIG. 2, comprises a relatively narrow annular end face 32 which is normally located flush with one side of passageway 14 so as to not create corners and the like to interfere with the flow of fluids into and out of the sample cavity. The radially outer edge of end face 32 meets with the inner edge of a cylindrical neck portion 34 of member 20. An inclined annular shoulder 36, defined by a predetermined included angle, joins neck portion 34 to the remainder of holder member 20. Composite opening 18 is formed with a similar inclined annular shoulder 38 having a slightly larger included angle, on the order of about 2° more, to cooperate with shoulder 36. Thus, a secure fluidtight seal is formed between the holder and the cooperating portion of passageway 18, in that, as most clearly shown in FIG. 2, the radially inside male corner in the passageway seals in the female corner formed between shoulder 36 and neck portion 34. As these parts wear, the seal area can effectually "move" because of the clearance provided by the difference in the two included angles defining the two shoulders 36 and 38.

The radially inner edge of end face 32 of the holder 20 meets with a conical surface 40 formed in the inner end face of member 20. Surface 40 is defined by a predetermined included angle. A cavity 42 for containing samples is formed to a predetermined volume at the inside of surface 40 and extends into the holder member 20.

Thus, as is readily apparent, different size samples can be taken by simply removing plug 26 and putting in a new holder member 20 having a cavity 42 of the desired size. This flexibility and the ease with which this is accomplished is an advantage over the prior art. As an indication of orders of magnitude only and not as a limitation, devices embodying the invention have been built, they are externally roughly cubical measuring 2 to 3 inches on an edge, and have sample cavity capacities varying from about 1 $\mu l.$ to about $20\mu l$.

The tip of the stem 22 is formed with a conical surface 44 defined by an included angle slightly smaller, on the order of about 2°, than the included angle defining surface 40. Thus, a secure surface-to-edge seal is formed between the stem and the holder member, and this seal has a certain amount of built-in correction for wear because of the difference in the two included angles. The structure here is similar to that described above as to the two shoulders 36 and 38. In regard to sample cavity capacity; it will of course be understood that said capacity is defined solely by cavity 42, the amount of intrusion of the stem tip into the cavity comprising a constant and easily accommodated correction. Further, the conical surfaces 40 and 44 improve operation in that as the stem moves off of the holder the flow in passageway 14 is caused to change direction and to move towards cavity 42, thus tending to "sweep" the sample out of the cavity as a slug.

Means are provided to permit free flow of fluid through passageway 14 in all positions of stem 22, i.e., before, during, and after taking or releasing a sample. Two different embodiments of such means are provided. Referring to the preferred form of FIGS. 1 and 2, stem 22, immediately after surface 44, is formed with an arcuate cutout 46. In the second form of FIG. 3, the entire tip end of the stem is reduced down to a cylindrical smaller diameter portion 48. All other parts shown in FIG. 3 are the same as in FIGS. 1 and 2 and therefore carry the same reference numerals. In both cases, cutout 46 and reduced diameter portion 48, sufficient space is provided around the stem that flow is uninterrupted while the stem moves and in all positions of the stem, with respect to the holder.

Means are provided to move the stem onto and off of the holder with translational motion only, i.e., without rotation of the stem about its own axis. Nonrotational sealing motion is desired because, at the high sealing pressures used and with a metal-to-metal contact, the finely finished sealing surfaces would be quickly marred and destroyed. Means are also provided to limit and control the amount of sealing pressure applied between the surfaces 40 and 44, and to provide a fluidtight seal around the stem.

To all these ends, a stem assembly 50 is provided, and comprises a nut member 52 having external threads 54 cooperable with mating threads formed in the adjacent end of composite opening 18. A jamnut 56 is provided to fix nut 52 with respect to main body 12 after all the other parts are properly positioned. In spaced relation to passageway 14, passageway 18 is formed with a blind recess 58 in which is located suitable gasketing means 60, which may comprise Teflon or graphite filled Teflon, or the like. A gland member 62 has its inner end in recess 58 on top of gasketing means 60 to compress the gasket around the stem. The outer face of gland 62 contacts the inner face of nut 52, whereby nut 52 via gland 62 is used to compress the gasket 60 around the stem. The distance between the end of recess 58 and the closest part of passageway 14 is greater than the travel of the stem so that the clearance means, cutout 46 or reduced diameter portion 48, or whatever else is in use, will not contact the gasket, which contact could possibly impair the seal around the stem.

Stem assembly 50 also comprises a hollow stud portion 64 formed with external threads 66 cooperable with threads 68 formed on the inside of nut 52. Stem 22 is formed with a shoulder or other suitable abutment 70, outwardly of which the stem comprises a reduced diameter elongated shank portion 72. Between shoulder 70 and the inner face of stud portion 64 there is provided a pair of flat washers 74 between which is located one or a plurality of axial loading springs 76, known as Belleville springs. Integrally joined to stud portion 66 are a collar portion 78 and an elongated sleeve portion 80 which extends outwardly of nut 52 via a clearance opening 82 and terminates in an operating handle 84 which is joined to the sleeve 80 by any suitable means. Stem shank 72 extends coextensively with stud 66, collar 78 and sleeve 80, and extends outwardly beyond handle 84. The outer end of the shank 72 may be held in normal relation to handle 84 by suitable threads, not shown, formed on the end of the shank cooperating with a suitable nut and washer array 86.

The spring 76 permits the user to determine or select the sealing pressure which will be produced between the surfaces 40 and 44. After the value desired for this parameter has been decided, an appropriate number of and strength of springs selected, and the parts assembled as shown in the drawing, in the obvious order of from the innermost outwardly, the user will thereafter automatically obtain this predetermined amount of sealing pressure.

To take a sample, the entire assembled device 10, with the stem withdrawn from the holder 20, is connected into the system via threads or connecting means 16. The usual chromatographic practices are followed, unless otherwise indicated. The stem is then brought into contact with the holder 20 by turning handle 84 which via sleeve 80, collar 78, and the mating threads 66 on the stud 64 and 68 on the inside of nut 52 axially translates the entire stud without causing it to rotate. Continued turning of handle 84 builds up the pressure seal between surfaces 40 and 44 and loads springs 76 to their predetermined value. Further continued operation of handle 84 beyond this load will cause compression of spring or springs 76 producing a visible motion of the handle 84 with respect to the array of nuts and washers 86. Thus, the operator is alerted that he has reached full sealing condition, a loose seal is avoided since the operator knows that he is not done until he has reached this condition, while at the same time the sealing surfaces are protected against being overloaded since the overload is absorbed by the springs. To release a sample, the handle 84 is simply operated in the opposite direction. To change sample size, the user simply unscrews plug 26, removes holder 20, inserts a different holder 20 having the desired cavity size, and replaces plug 26.

Referring to FIG. 4, there is shown an embodiment 10a adapted to take up to five samples from a single stream, if desired. Device 10a can be thought of as five devices 10 in a single body 12a. All parts in FIG. 4 are indicated by the reference numerals used above followed by "a." It is often desirable to take more than one sample from a single stream, for example, periodically over some length of time. This form 10a of the invention provides the capacity to take any number up to the maximum capacity without disconnection from the stream. It will of course be understood that this FIG. 4 is highly diagrammatic, and only the larger parts are shown and numbered, but that all parts, as described above, are included.

While the invention has been described in detail above, it is to be understood that this detailed description is by way of example only, and the protection granted is to be limited only within the spirit of the invention and the scope of the following claims.

We claim:

1. A chromatographic sampler comprising a body formed with a through flow passageway and a composite through opening intersecting said passageway, a stem assembly removably mounted in said opening to one side of said passageway, a sample holder member, means to removably mount said sample holder member in said opening adjacent the other side of said passageway and opposite said stem assembly, said stem assembly including a stem member and means to permit motion of said stem member with respect to said sample holder member, and said stem and holder members comprising cooperable means therebetween to trap and seal a sample of any fluid in said passageway and to permit a trapped sample to be later swept out of said sample holder member as a slug.

2. The combination of claim 1, said holder member removable mounting means comprising a pair of operatively cooperable annular shoulders formed one on said holder member and the other on the adjacent portion of said composite opening, said shoulders being adapted to limit the motion of said holder member through said opening towards said passageway, and a threaded plug member cooperable with threads formed in said opening and adapted to urge said holder member towards said passageway.

3. The combination of claim 2, said shoulder on said holder member being defined by a first predetermined included angle, said shoulder in said opening being defined by a second predetermined included angle, and said first predetermined included angle being smaller than said second predetermined included angle.

4. The combination of claim 3, said first predetermined included angle being smaller than said second predetermined included angle by about 2°.

5. The combination of claim 1, said holder member being of milkcanlike shape and comprising an annular inclined shoulder immediately its ends defined by a first predetermined included angle, said composite opening being formed with an annular inclined shoulder defined by a second predetermined included angle and operatively cooperable with said inclined annular shoulder of said holder member, and said first predetermined included angle being smaller than said second predetermined included angle.

6. The combination of claim 5, said first predetermined included angle being smaller than said second predetermined included angle by about 2°.

7. The combination of claim 1, said cooperable trapping and sealing means between said stem member and said holder member comprising a sample cavity formed in said holder member and positioned entirely out of said passageway, and a tip end of said stem member adapted to contact an outer defining edge of said cavity.

8. The combination of claim 7, said cooperable trapping and sealing means between said stem member and said holder member further comprising a female conical surface defined by a first predetermined included angle formed in said holder member and extending from said edge of said cavity to the end of said holder member which is located closest to said passageway, said tip end of said stem member being defined by a male conical surface defined by a second predetermined included angle, and said first predetermined included angle being larger than said second predetermined included angle.

9. The combination of claim 8, said first predetermined included angle being larger than said second predetermined included angle by about 2°.

10. The combination of claim 1, said stem member comprising means to permit fluid flow through said passageway in all positions of said stem member with respect to said holder member.

11. The combination of claim 10, said flow permitting means comprising a reduced cross-sectional area portion of said stem member in closely spaced relation to the tip end thereof.

12. The combination of claim 1, said stem assembly comprising means to form a fluidtight seal around said stem member.

13. The combination of claim 1, wherein said means to permit motion of said stem member permits longitudinal translational motion of said stem member without causing said stem member to rotate about its own axis.

14. The combination of claim 1, said stem assembly further comprising means to control the pressure force produced between said stem member and said holder member when said stem member is urged against said holder member, said control means comprising at least one axial loading spring of a predetermined strength interposed between spring abutment means on said stem member and in sliding contact with a threaded rotatable member of said stem assembly, whereby rotation of said rotatable member urges said stem member towards said holder member via said spring until a pressure force between said stem member and said holder member is produced which is large enough to overcome the strength of said spring, whereupon the force produced by further rotation of said rotatable member is absorbed by said spring.